Nov. 2, 1937.   J. E. JOHANSSON   2,097,883
INTERNAL COMBUSTION POWER PLANT
Filed Dec. 14, 1933   5 Sheets—Sheet 3

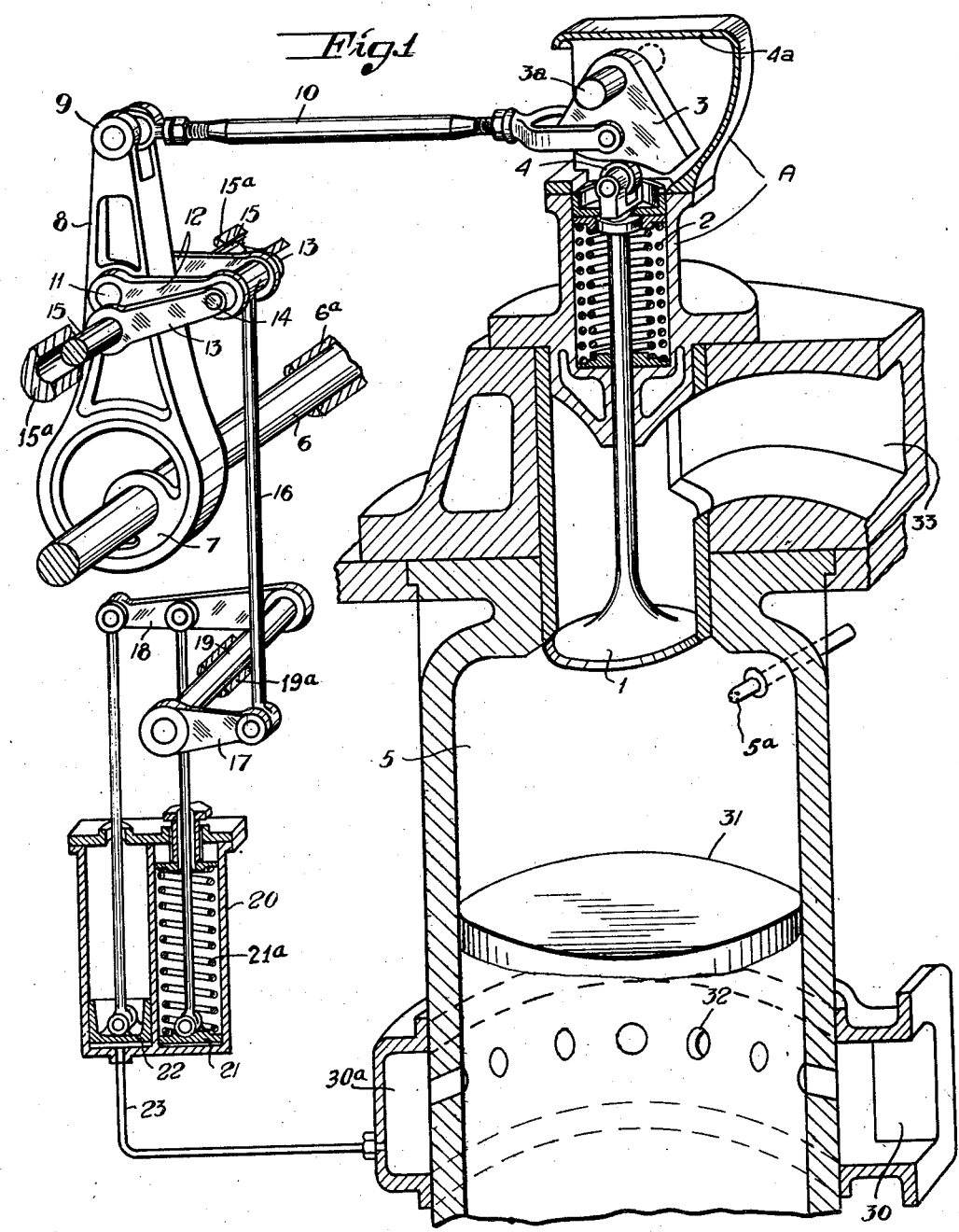

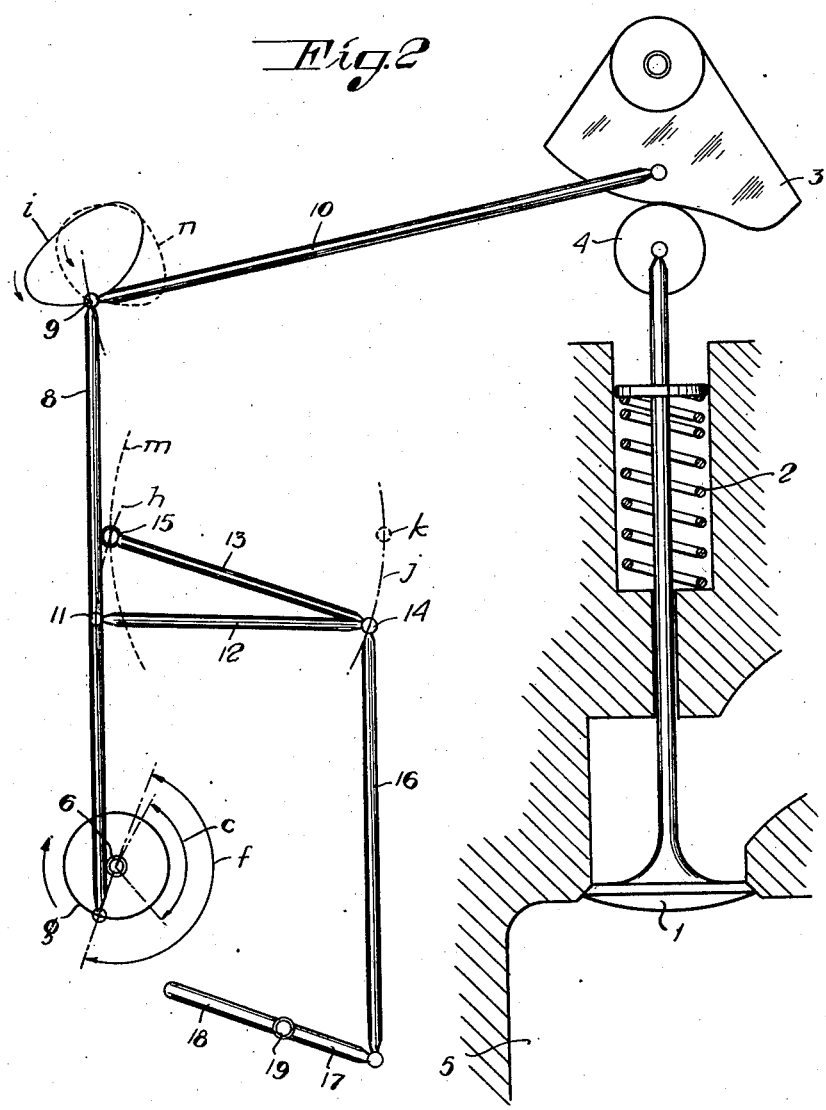

INVENTOR.
Johan Erik Johansson
BY
his ATTORNEY.

Nov. 2, 1937.    J. E. JOHANSSON    2,097,883
INTERNAL COMBUSTION POWER PLANT
Filed Dec. 14, 1933    5 Sheets-Sheet 4
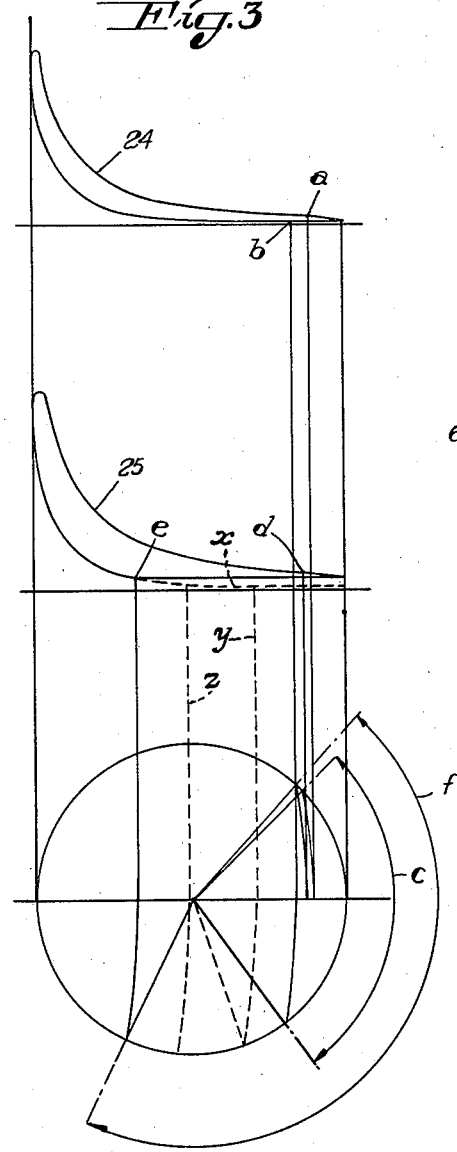
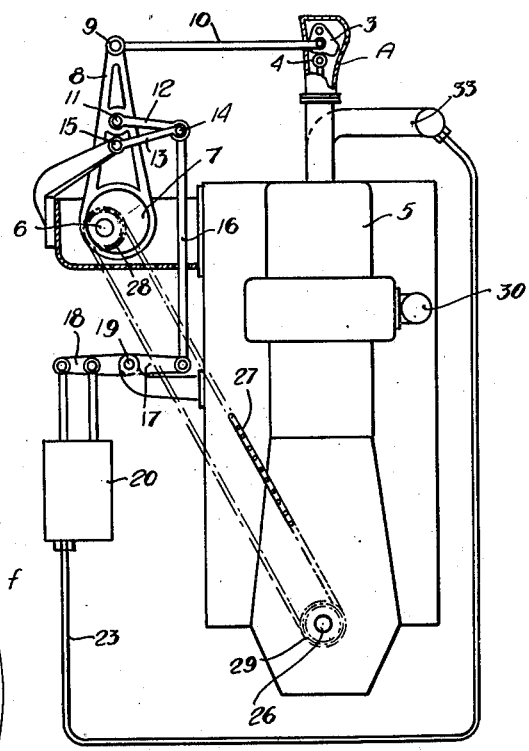
INVENTOR
Johan Erik Johansson
BY
his ATTORNEY

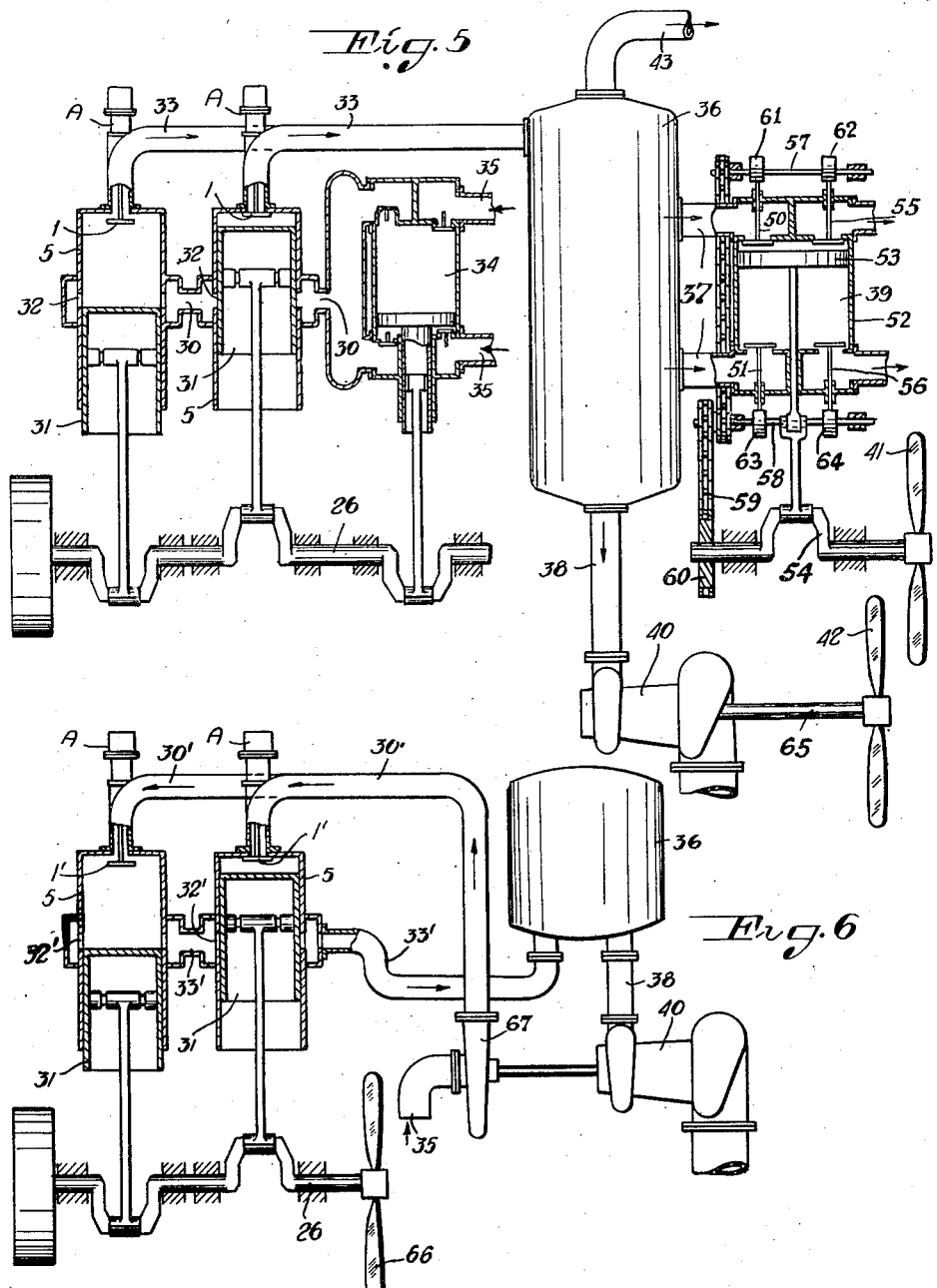

Patented Nov. 2, 1937

2,097,883

UNITED STATES PATENT OFFICE 2,097,883

INTERNAL COMBUSTION POWER PLANT

Johan Erik Johansson, Gothenburg, Sweden, assignor to Aktiebolaget Götaverken, Gothenburg, Sweden, a corporation of Sweden Application December 14, 1933, Serial No. 702,377
In Sweden December 15, 1932

7 Claims. (Cl. 60—44)

The present invention relates to internal combustion power plants and has particular reference to internal combustion power plants of the kind wherein exhaust gases, exhausted at a pressure above atmospheric and mixed with compressed air, are utilized as motive fluid for other engines.

The invention is particularly advantageous when embodied in a power plant wherein such exhaust gases are derived from a two-stroke cycle Diesel engine, the mechanical output of such engine being made use of wholly or in part to assist in the production of the high pressure motive fluid by being utilized wholly or in part for the operation of air compressing means, the compressed air from which advantageously forms a part of the motive fluid for the other engines as well as being used as scavenging and charging air for the Diesel.

In internal combustion engines of the above mentioned type, the pressure of the motive fluid produced by the exhaust of the engine may vary considerably due to variations in operating conditions. This will be reflected in variations in the pressure of the compressed air, a portion of which is used as charging air. As a result the compression pressure in the cylinders of the Diesel engine may become too high with a high initial charging air pressure and may also, with low initial charging air pressure, become too low to insure the ignition due to heat of compression which is characteristic of the Diesel cycle. Starting of the engine is one example of the latter condition, when there may be low compressed air pressure resulting in low initial charging air pressure and consequently low heat of compression in the engine cylinders.

A primary object of the present invention is to provide a power plant of the kind under discussion incorporating compression controlling means of simple and practical construction, adapted to be readily regulated during operation of the engine, which will insure dependable ignition due to the heat of compression while avoiding excessively high compression pressures, in spite of the variations in pressure of the compressed air as delivered to the engine cylinders.

Other and more detailed objects of the invention will become apparent as the remaining portion of this specification proceeds.

As will hereinafter more fully be explained in detail, the primary object of the invention is attained by means which, when the engine is being started or when conditions are such as to cause low pressure charging air to be delivered to the engine cylinders, will cause compression to commence comparatively early in the compression stroke, and, when conditions are such as to cause charging air to be delivered to the engine cylinders at comparatively high pressure, will cause compression to commence later in the compression stroke. By such means the final compression pressure in the engine cylinders may be maintained at a relatively constant value, insuring sufficient heat of compression at all times to make ignition reliable and also insuring against development of excessive or dangerously high compression pressures.

In order that the nature of the invention and its application may be understood clearly, I have illustrated more or less diagrammatically in the accompanying drawings various embodiments of apparatus for carrying the invention into effect and certain diagrams illustrative of the effect of the invention on the cycle of operation.

In the drawings:

Fig. 1 is a more or less diagrammatic perspective view, partly in section, illustrating one embodiment of apparatus for carrying the invention into effect;

Figure 2A:
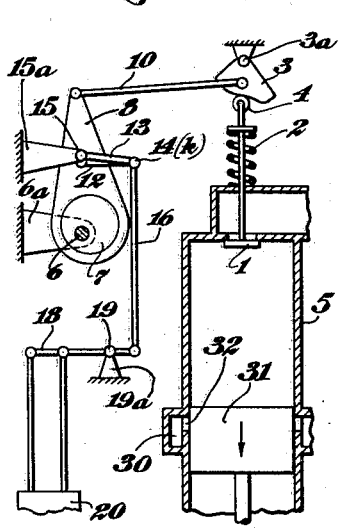
Fig. 2 is a diagrammatic view showing the action of the apparatus in different positions of adjustment.
Figure 2B:
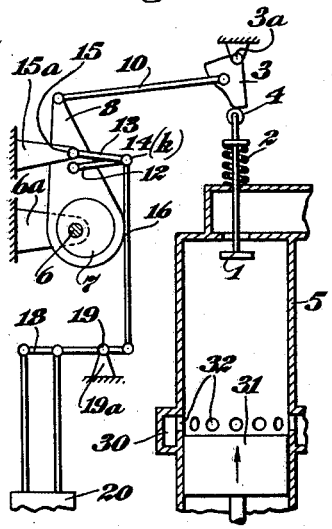
Figure 2C:
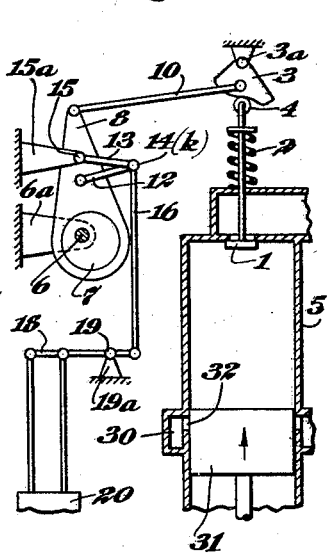
Figure 2D:
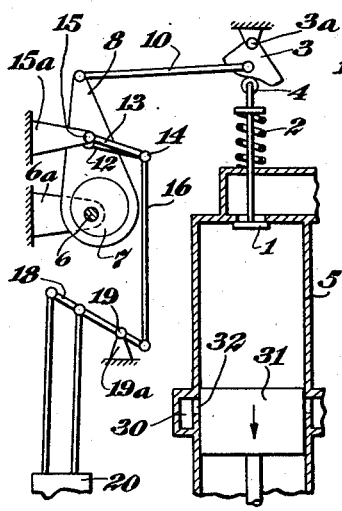
Figure 2E:
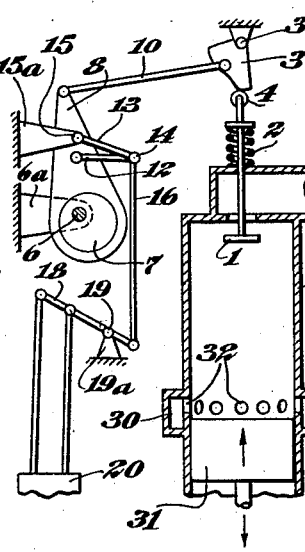
Figure 2F:
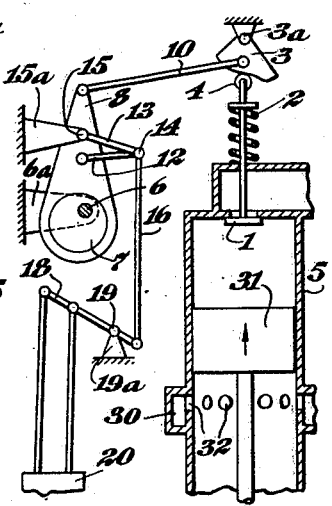

Figs. 2a to 2c, inclusive, are diagrammatic views showing the positions of the apparatus shown in Fig. 1 at different times in the cycle of valve operation under conditions producing low pressure charging air for the cylinders;

Figs. 2d to 2f are views similar to Figs. 2a to 2c showing corresponding positions of the valve apparatus under conditions productive of high pressure charging air;

Fig. 3 is an indicator diagram illustrative of the effect of adjustment of the apparatus shown in Figs. 2 to 2f;

Fig. 4 is an end elevation of an engine embodying the invention;

Fig. 5 is a diagrammatic side view partly in section of one form of power plant embodying the invention, and Fig. 6 is a view similar to Fig. 5 showing another form of power plant embodying the invention.

Referring now more particularly to Fig. 1 of the drawings, reference numeral A indicates generally a valve controlling device arranged to control the opening and closing of an engine exhaust valve I, the valve being closed by springs 2 and opened against the action of the springs by means of an oscillating cam 3 engaging a roller 4 mounted on the valve stem. Cam 3 is pivoted on pin 3a which is carried by the support 4a.

The above described structure is associated with the cylinder 5 of a two-stroke cycle Diesel engine, having a piston 31, to which cylinder fuel is injected in the usual manner through an injection nozzle indicated diagrammatically at 5a. The engine cylinder shown is intended during normal operation to deliver exhaust gases through valve 1 and exhaust passage 33 at comparatively high back pressure, for example 4 to 6 kilograms per square centimeter, for further expansion in other power producing apparatus. Scavenging and charging air is admitted to the cylinder through the ports 32 when the latter are uncovered by the piston 31.

Cam 3 is actuated from cam shaft 6 mounted in any suitable manner, as in bearings indicated diagrammatically at 6a, the shaft being driven from the engine crank shaft by suitable means not shown in this figure. Shaft 6 is provided with an eccentric 7 arranged to actuate an eccentric strap 8. The free end 9 of this strap is connected to cam 3 by means of a link 10. The motion of the free end of the eccentric strap is determined by the combined action of the eccentric 7 and guide means comprising two pairs of links 12 and 13. Both pairs of links are attached at one end to a pin 14, the opposite ends of links 12 being attached to the strap 8 intermediate its ends by means of a pin 11 and the opposite ends of the pair of links 13 being attached to the pins 15 mounted in suitable fixed bearings 15a.

Pin 14 is connected by means of a link 16 to an automatic regulator 20 through an intermediate linkage comprising levers 17 and 18 fixed to a shaft 19, which is mounted in a suitable bearing 19a.

Movement of the regulator is determined by two plungers 21 and 22 mounted in the regulator casing. Plunger 21 is loaded by means of a spring 21a while plunger 22 is placed in communication through conduit 23 with the air inlet conduit 30 of the engine cylinder 5, which conduit terminates in an annular extension 30a encircling the cylinder. Both plungers are connected to the lever 18 so that the spring 21a acting on plunger 21 opposes movement of plunger 22 under the influence of air pressure transmitted through the connection 23.

Engines of the kind under discussion ordinarily drive their own scavenging and charging air compressor, the scavenging pressure in normal operation usually somewhat exceeding the exhaust gas pressure. Thus, when the ports 32 are uncovered by the piston on its downward or power stroke and valve 1 is opened, air enters through the ports and blows the exhaust gases out through valve 1. By the time the piston has closed ports 32 on its upward or compression stroke, the cylinder has been scavenged of exhaust gases and contains substantially pure air which is compressed by the piston when valve 1 closes. Under certain conditions, particularly starting, the scavenging and charging air pressure is lower than normal and in order to obtain a compression pressure necessary for reliable ignition the exhaust valve must close much sooner than in normal operation.

This is more clearly evident from the diagram of Fig. 3 wherein the line 24 denotes the indicator diagram under starting conditions. As shown in this diagram, the exhaust valve opens at point $a$ and closes at point $b$, at which latter point compression must commence if the maximum compression pressure shown on the diagram is to be obtained.

At 25 an indicator diagram illustrative of normal operation is shown, the exhaust valve in this case opening at the point $d$ and remaining open until point $e$ is reached. In the crank diagram shown below the indicator diagrams, the crank angles during which the exhaust valve remains open under starting and normal operating conditions are shown at $c$ and $f$ respectively. The dotted line $x$ associated with the diagram 25 is illustrative of intermediate air pressures for which the exhaust valve should remain open through crank angles determined by the lines $y$ and $z$.

The manner in which the regulating mechanism varies the crank angle during which the valve 1 remains open is more clearly illustrated in Figs. 2 to 2h.

Referring now to Fig. 2, it will be evident that in coaction with the guiding effect of the pin 11 the movement of the lower end of the eccentric strap 8 about the eccentric circle $g$ will cause a resultant movement of the free end 9 which is transmitted through link 10 to the cam 3. With the pin 14 in the position shown in this figure, the pin 11 will follow the curve indicated by broken line $h$ and the free end of the strap 8 will follow the path indicated by line $i$. This path of movement causes the valve to remain open through the crank angle $f$, which is suitable for normal operation of the engine. The regulator serves to move the pin 14 along the arc shown by the broken line $j$ and under starting conditions pin 14 takes the position indicated in dotted lines at $k$. With the pin 14 in the position $k$, pin 11 will be caused to move along the dotted line $m$ and this motion of pin 11 will cause the free end of strap 8 to move along the path indicated by the dotted line $n$. This latter path of movement corresponds to an opening of the exhaust valve through the crank angle $c$, suitable for starting conditions.

The above described action is shown more fully in Figs. 2a to 2f wherein in Figs. 2a to 2c the pin 14 is shown in a position corresponding to the position $k$ of Fig. 2. In Fig. 2a the valve 1 is shown about to open near the end of the working stroke. In Fig. 2b the valve is shown in fully open position as the piston starts upwardly on the compression stroke. In Fig. 2c the valve is shown as again closed with the piston still near the commencement of its compression stroke, the air ports for charging air having substantially just been covered by the piston.

Figs. 2d to 2f, inclusive, show the action of the valve with the regulating mechanism adjusted so that the pin 14 is in the position corresponding to the full line position shown in Fig. 2. In this position of the mechanism the valve 1 is shown in Fig. 2d, as about to open as the piston approaches the end of its working stroke. In Fig. 2e the valve is shown open as the piston starts on its compression stroke. In Fig. 2f the valve is shown as just closing, late in the compression stroke.

In Fig. 4 there is shown another embodiment of my invention, the same reference characters being used to designate parts similar to those shown in the preceding figures. This figure also illustrates the manner in which cam shaft 6 may be driven from the crank shaft 26 of the Diesel engine. As shown, a chain 27 engages a sprocket wheel 28 on the cam shaft and a sprocket wheel 29 on the crank shaft whereby the former is driven in the same direction and at the same speed as the latter.

This embodiment differs from that shown in Figs. 1, 2, and 3 in that the regulator 20 for controlling the opening of the valve 1 is responsive to the pressure of the gases exhausted from the Diesel engine, instead of being responsive to the pressure of the scavenging and charging air supplied to the Diesel. This is accomplished by connecting conduit 23, leading from the regulator 20, to the exhaust passage 33.

It will be understood that when the regulator is connected to the exhaust outlet 33 the action is like the action which occurs when the regulator is connected to the inlet 30 for scavenging air. Both the scavenging air and the exhaust from the engine constitute fluids, the pressure of which is indicative of compression pressure attained in the engine cylinder. When the pressure of either of these fluids decreases it indicates a decrease in the compression pressure obtained in the engine, and in order to maintain the compression pressure at the desired value, in accordance with the present invention, the time of commencement of the compression period is advanced.

The apparatus shown in Fig. 5 is particularly well adapted for ship propulsion. There is here shown a Diesel engine of the two-stroke cycle type having two cylinders within which are reciprocably mounted pistons 31 connected to the crank shaft 26. Each cylinder is provided with an exhaust valve 1 which is controlled by mechanism in all respects similar to that described in connection with Figs. 1, 2, and 4. Also connected to crank shaft 26 is an air compressor 34 of the double acting plunger type. Atmospheric air is drawn into the compressor through inlets 35, compressed in the cylinder and discharged to the intakes 30 of the Diesel cylinders 5. This air, which constitutes the scavenging and charging air, is introduced into the Diesel cylinders through the ports 32 when the latter are uncovered by the pistons 31.

The exhaust gases discharged from the Diesel cylinders 5 through the exhaust passages 33 are conducted to a receiver 36. These high pressure gases are supplied from the receiver through conduits 37 to the intake valves 50 and 51 to the cylinders 52 of a double acting reciprocating engine 39. The piston 53 of this engine drives a crank shaft 54 to which is connected a propeller 41. The gases expanded in the cylinders 52 are discharged therefrom through exhaust valves 55 and 56. The timing mechanism for inlet valves 50 and 51 and exhaust valves 55 and 56 may be of a conventional type and is shown as including cam shafts 57 and 58 driven by a chain 59 from a sprocket 60 mounted on the crank shaft 54. Cam shaft 57 carries a cam 61 for actuating inlet valve 50 and a cam 62 for actuating exhaust valve 55, while cam shaft 58 carries cams 63 and 64 for actuating inlet valve 51 and exhaust valve 56, respectively.

High pressure gases are also supplied from receiver 36 through conduit 38 to a gas turbine 40, the power shaft 65 of which drives a propeller 42. High pressure gas may also be supplied from receiver 36 through conduit 43 to operate various auxiliary apparatuses commonly found on a ship.

In the embodiment shown in Fig. 6, the crank shaft 26 of the Diesel engine is connected to drive a propeller 66. In this embodiment the valves 1' are inlet valves and scavenging and charging air are supplied to the cylinders 5 through these valves from conduits 30'. The exhaust gases are blown from the cylinders through the ports 32' when the latter are uncovered by the pistons 31. The high pressure exhaust gases pass through exhaust passage 33' to the receiver 36. From here they are supplied through the conduit 38 to the gas turbine 40, the power shaft of which drives the turbo compressor 67 which supplies the scavenging and charging air to the Diesel engine.

As in the previous embodiments, the final compression pressure in the Diesel cylinders is dependent on the pressure of the scavenging and charging air introduced for any particular setting of the inlet valves 1'. In order that the compression pressure may be maintained substantially constant upon an increase in the pressure of the charging air, it is necessary to retard the closing of the inlet valves. Thus, if the pressure of the charging air is comparatively low, the valves 1' should close substantially immediately after the ports 32' have been covered by the pistons so that compression may take place throughout the entire stroke of the piston. On the other hand, if the charging air pressure is high, the valves 1' should be maintained open during the first part of the compression stroke of the pistons so that air in the cylinders may be forced back out through the valves 1' and the conduits 30' against the action of turbo-compressor 67 so that actual compression within the cylinders will not start until after the compression stroke of the piston has been partially completed.

It will thus be seen that the timing of inlet valves 1' is the same as the timing of the exhaust valves 1 in the previous embodiments and the same timing mechanism may be employed.

The arrangement may obviously be subjected to alterations, according to the circumstances, falling within the scope of the following claims.

As shown in Fig. 2, the automatic regulator may be omitted, the control being then effected manually by means of the hand lever 18. The embodiments illustrated and described are not to be considered as constituting a limitation of the invention, the scope of which is to be determined by the appended claims interpreted as broadly as the state of the art will permit.

What I claim is:—

1. In a power plant, the combination with a reciprocating internal combustion engine having a cylinder in which charge forming air is compressed and which discharges combustion gases at substantial back pressure for further expansion in a prime mover, of air compressing means for supplying charging and scavenging air to said cylinder at pressure sufficiently high to cause a part of such air to be discharged at said back pressure with said combustion gases, and means responsive to a fluid pressure indicative of the final compression pressure in the engine cylinder for maintaining said final compression pressure substantially constant by varying the commencement of the period of compression in the cycle of operation of said engine.

2. In a power plant, the combination with a reciprocating internal combustion engine having a cylinder in which charge forming air is compressed and which discharges combustion gases at substantial back pressure for further expansion in a prime mover, of air compressing means driven by said engine for supplying charging and scavenging air to said cylinder at pressure sufficiently high to cause a part of such air to be discharged at said back pressure with said combustion gases, and means responsive to a fluid pressure indicative of the final compression pressure in the engine cylinder for maintaining said final compression pressure substantially constant by varying the commencement of the period of compression in the cycle of operation of said engine.

3. In a power plant, the combination with a reciprocating internal combustion engine having a cylinder in which charge forming air is compressed and which discharges combustion gases at substantial back pressure for further expansion in a prime mover, of air compressing means for supplying charging and scavenging air to said cylinder at pressure sufficiently high to cause a part of such air to be discharged at said back pressure with said combustion gases, and means responsive to variations in the pressure of the compressed air as supplied to the cylinder for maintaining said final compression pressure substantially constant by varying the commencement of the period of compression in the cycle of operation of said engine.

4. In a power plant, the combination with a reciprocating internal combustion engine having a cylinder in which charge forming air is compressed and having timed valve means the closing of which determines the commencement of the compression period in said cylinder, said cylinder discharging combustion gases at substantial back pressure for further expansion in a prime mover, of air compressing means for supplying charging and scavenging air to said engine at pressure sufficiently high to cause a part of such air to be discharged at said back pressure with said combustion gases, and means responsive to a fluid pressure indicative of the final compression pressure in said cylinder for maintaining said final compression pressure substantially constant by altering the timing of said valve means to advance the time of commencement of said compression period upon decrease in the pressure of the last mentioned fluid.

5. In a power plant, the combination with a reciprocating two stroke cycle compression ignition internal combustion engine having a cylinder in which charge forming air is compressed and having timed exhaust valve means for discharging combustion gases, said cylinder discharging such gases at substantial back pressure for further expansion in a prime mover, of air compressing means driven by said engine for supplying charging and scavenging air to said engine at pressure sufficiently high to cause a part of such air to be discharged at said back pressure with said combustion gases, and means responsive to a fluid pressure indicative of the final compression pressure in said cylinder for maintaining said final compression pressure substantially constant by altering the timing of said exhaust valve means to advance the time of commencement of the compression period upon decrease in the pressure of the last mentioned fluid.

6. In a power plant, the combination with a reciprocating two stroke cycle compression ignition internal combustion engine having a cylinder in which charge forming air is compressed and having timed exhaust valve means for discharging combustion gases, said cylinder discharging such gases at substantial back pressure for further expansion in a prime mover, of air compressing means driven by said engine for supplying charging and scavenging air to said engine at pressure sufficiently high to cause a part of such air to be discharged at said back pressure with said combustion gases, and means responsive to the pressure of said air as delivered to the cylinder for maintaining said final compression pressure substantially constant by advancing the time of closing of said exhaust valve means upon decrease in the pressure of said air.

7. In a power plant, the combination with a reciprocating internal combustion engine having a cylinder in which charge forming air is compressed and having timed valve means, the closing of which determines the commencement of the compression period in the cylinder, said cylinder discharging combustion gases at substantial back pressure for further expansion in a prime mover, of air compressing means driven by said engine, a conduit providing for free and unthrottled flow of air from said air compressing means to said cylinder, said air compressing means delivering charging and scavenging air to said cylinder at pressure sufficiently high to cause a part of such air to be discharged at said back pressure with said combustion gases, and means responsive to variations in pressure in said conduit for maintaining the final compression pressure substantially constant by altering the timing of said valve means to advance the time of commencement of said compression period upon decrease in the pressure of said air.

JOHAN ERIK JOHANSSON.